United States Patent
Leleannec et al.

(10) Patent No.: US 12,316,874 B2
(45) Date of Patent: May 27, 2025

(54) SECONDARY TRANSFORM FOR VIDEO ENCODING AND DECODING

(71) Applicant: INTERDIGITAL CE PATENT HOLDINGS, SAS, Paris (FR)

(72) Inventors: Fabrice Leleannec, Betton (FR); Karam Naser, Mouazé (FR); Tangi Poirier, Thorigné-Fouillard (FR); Franck Galpin, Thorigne-Fouillard (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 128 days.

(21) Appl. No.: 17/632,957

(22) PCT Filed: Jul. 27, 2020

(86) PCT No.: PCT/EP2020/071151
§ 371 (c)(1),
(2) Date: Feb. 4, 2022

(87) PCT Pub. No.: WO2021/023552
PCT Pub. Date: Feb. 11, 2021

(65) Prior Publication Data
US 2022/0345744 A1     Oct. 27, 2022

(30) Foreign Application Priority Data

Aug. 6, 2019 (EP) ..................... 19306007
Sep. 23, 2019 (EP) ..................... 19306174
Sep. 24, 2019 (EP) ..................... 19306182

(51) Int. Cl.
*H04N 19/625* (2014.01)
*H04N 19/11* (2014.01)
(Continued)

(52) U.S. Cl.
CPC .......... *H04N 19/625* (2014.11); *H04N 19/11* (2014.11); *H04N 19/119* (2014.11); *H04N 19/122* (2014.11); *H04N 19/176* (2014.11)

(58) Field of Classification Search
None
See application file for complete search history.

(56) References Cited

U.S. PATENT DOCUMENTS 10,609,367 B2    3/2020    Zhao et al.
2017/0094313 A1*  3/2017   Zhao .................. H04L 43/16
(Continued)

FOREIGN PATENT DOCUMENTS

CN    110024393 A    7/2019
EP      3443746 A1   2/2019
WO   2019/067907 A1  4/2019

OTHER PUBLICATIONS

Zhao et al., "CE6-related: Unified LFNST using block size independent kernel", Joint Video Experts Team (JVET) of ITU-T SG 16 WP 3 and ISO/IEC JTC 1/SC 29/WG 11, Document: JVET-O0539-v2, 15th Meeting: Gothenburg, Sweden, Jul. 3, 2019, 12 pages.

(Continued)

*Primary Examiner* — James M Anderson, II
(74) *Attorney, Agent, or Firm* — Condo Roccia Koptiw LLP

(57) ABSTRACT

A method and apparatus for encoding/decoding a picture use a secondary transform for video encoding and decoding in INTRA mode and more particularly use a secondary transform for the transform units of a coding unit in intra sub partition mode. Different signaling and selection variants are proposed according to various parameters of the coding unit and transform unit.

18 Claims, 14 Drawing Sheets

(51) Int. Cl.
*H04N 19/119* (2014.01)
*H04N 19/122* (2014.01)
*H04N 19/176* (2014.01)

(56) References Cited

U.S. PATENT DOCUMENTS

| | | | |
|---|---|---|---|
| 2018/0103252 A1 | 4/2018 | Hsieh et al. | |
| 2019/0104322 A1 | 4/2019 | Tsukuba | |
| 2019/0149823 A1 | 5/2019 | Lim et al. | |
| 2020/0322636 A1* | 10/2020 | Egilmez | H04N 19/625 |
| 2021/0321134 A1* | 10/2021 | Koo | H04N 19/91 |

OTHER PUBLICATIONS

Wieckowski et al., "NextSoftware: An alternative implementation of the Joint Exploration Model (JEM)", The Joint Video Exploration Team of ITU-T SG 16 and ISO/IEC JTC 1/SC 29/WG11, Document: JVET H0084, 8th Meeting, Macao, China, Oct. 18, 2017, 12 pages.

Bross et al., "Versatile Video Coding (Draft 6)", Joint Video Experts Team (JVET) of ITU-T SG 16 WP 3 and ISO/IEC JTC 1/SC 29/WG 11, Document: JVET-O2001-vE, 15th Meeting: Gothenburg, Sweden, Jul. 3, 2019, 455 pages.

Chen et al, "Algorithm description for Versatile Video Coding and Test Model 5 (VTM 5)", The Joint Video Experts Team (JVET) of ITU-T SG 16 WP 3 and ISO/IEC JTC 1/SC 29/WG 11, Document: JVET-N1002-v2, 14th Meeting, Geneva, Switzerland, Mar. 19, 2019, 76 pages.

JVET-O0094-R1, "CE6-2.1: Simplification of Low Frequency Non-Separable Transform", Joint Video Experts Team (JVET) of ITU-T SG 16 WP 3 and ISO/IEC JTC 1/SC 29/WG 11, Jul. 3-12, 2019, 7 pages.

* cited by examiner

| | 2 | 4 | 8 | 16 | 32 | 64 |
|---|---|---|---|---|---|---|
| 2 | {DCT2,DCT2} | {DST7,DCT2} | {DST7,DCT2} | {DST7,DCT2} | {DCT2,DCT2} | {DCT2,DCT2} |
| 4 | {DCT2,DST7} | {DST7,DST7} | {DST7,DST7} | {DST7,DST7} | {DCT2,DST7} | {DCT2,DST7} |
| 8 | {DCT2,DST7} | {DST7,DST7} | {DST7,DST7} | {DST7,DST7} | {DCT2,DST7} | {DCT2,DST7} |
| 16 | {DCT2,DST7} | {DST7,DST7} | {DST7,DST7} | {DST7,DST7} | {DCT2,DST7} | {DCT2,DST7} |
| 32 | {DCT2,DCT2} | {DST7,DCT2} | {DST7,DCT2} | {DST7,DCT2} | {DCT2,DCT2} | {DCT2,DCT2} |
| 64 | {DCT2,DCT2} | {DST7,DCT2} | {DST7,DCT2} | {DST7,DCT2} | {DCT2,DCT2} | {DCT2,DCT2} |

{H_transform, V_transform}

SECONDARY TRANSFORM FOR VIDEO ENCODING AND DECODING

CROSS REFERENCE TO RELATED APPLICATIONS

This application is a U.S. National Stage Application under 35 U.S.C. 371 of International Patent Application No. PCT/EP2020/071151, filed Jul. 27, 2020, which is incorporated herein by reference in its entirety.

This application claims the benefit of European Patent Application Nos. 19306007, filed Aug. 6, 2019; U.S. Pat. No. 19,306,174, filed Sep. 23, 2019; and U.S. Pat. No. 19,306,182, filed Sep. 24, 2019, each of which is incorporated herein by reference in its entirety.

TECHNICAL FIELD

At least one of the present embodiments generally relates to the field of video compression. At least one embodiment particularly aims at using a secondary transform for video encoding or decoding of intra sub block partitions.

BACKGROUND

To achieve high compression efficiency, image and video coding schemes usually employ prediction and transform to leverage spatial and temporal redundancy in the video content. Generally, intra or inter prediction is used to exploit the intra or inter frame correlation, then the differences between the original block and the predicted block, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

One or more of the present embodiments use a secondary transform for video encoding and decoding in INTRA mode and more particularly use a secondary transform for the transform units of a coding unit in intra sub partition mode. Different signaling and selection variants are proposed according to various parameters of the coding unit and transform unit.

According to a first aspect of at least one embodiment, a video encoding method comprises applying a first transform over a coding unit, deciding if a second transform is to be applied and when a second transform is to be applied: signaling the use of a second transform for a coding unit and performing second transform on the transform units of the coding unit, then encoding the coding unit with signaling information, wherein coding units are coded in intra-sub partition mode.

According to a second aspect of at least one embodiment, a video decoding method comprises, when a second transform is signaled for the coding unit, performing second inverse transform on the transform unit and first inverse transform on the transform units of the coding unit and decoding the inversed transform units, wherein coding units are coded in intra-sub partition mode.

According to a third aspect of at least one embodiment, an apparatus, comprises an encoder for encoding picture data for at least one block in a picture or video wherein the encoder is configured to apply a first transform over a coding unit, decide if a second transform is to be applied and when a second transform is to be applied: signal the use of a second transform for a coding unit and perform second transform on the transform units of the coding unit, then encode the coding unit with signaling information, wherein coding units are coded in intra-sub partition mode.

According to a fourth aspect of at least one embodiment, an apparatus, comprises a decoder for decoding picture data for at least one block in a picture or video wherein the decoder is configured to, when a second transform is signaled for the coding unit, perform second inverse transform on the transform unit and first inverse transform on the transform units of the coding unit and then decode the inversed transform units, wherein coding units are coded in intra-sub partition mode.

According to a fifth aspect of at least one embodiment, a computer program comprising program code instructions executable by a processor is presented, the computer program implementing the steps of a method according to at least the first or second aspect.

According to a sixth aspect of at least one embodiment, a computer program product which is stored on a non-transitory computer readable medium and comprises program code instructions executable by a processor is presented, the computer program product implementing the steps of a method according to at least the first or second aspect.

DETAILED DESCRIPTION

Various embodiments relate to the use of a secondary transform for video encoding and decoding of transform units of a coding unit in intra sub partition mode. Various methods and other aspects described in this application can be used for signaling and selection of the transform to be used according to various parameters of the coding unit and transform unit.

Moreover, the present aspects, although describing principles related to particular drafts of VVC (Versatile Video Coding) or to HEVC (High Efficiency Video Coding) specifications, are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Figure 1:
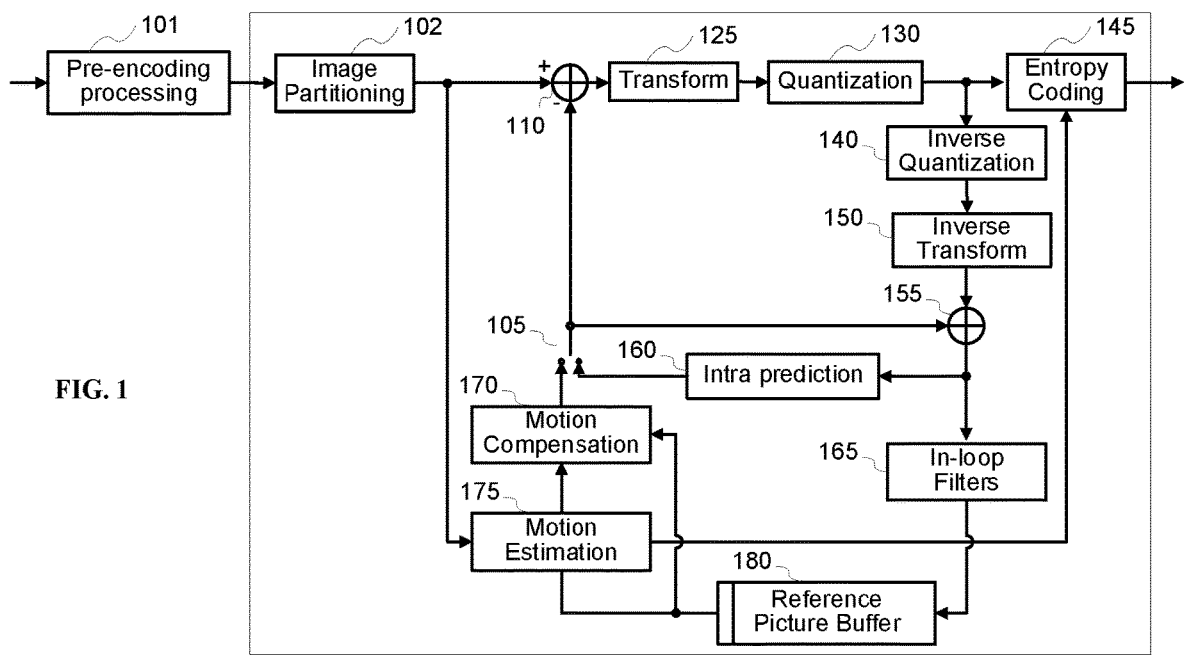
FIG. 1 illustrates a block diagram of an example of video encoder 100, such as a High Efficiency Video Coding (HEVC) encoder.

FIG. 1 illustrates block diagram of an example of video encoder 100, such as a HEVC encoder. FIG. 1 may also illustrate an encoder in which improvements are made to the HEVC standard or an encoder employing technologies similar to HEVC, such as a JEM (Joint Exploration Model) encoder under development by JVET (Joint Video Exploration Team) for VVC.

Before being encoded, the video sequence can go through pre-encoding processing (101). This is for example performed by applying a color transform to the input color picture (for example, conversion from RGB 4:4:4 to YCbCr 4:2:0) or performing a remapping of the input picture components in order to get a signal distribution more resilient to compression (for instance using a histogram equalization of one of the color components). Metadata can be associated with the pre-processing and attached to the bitstream.

In HEVC, to encode a video sequence with one or more pictures, a picture is partitioned (102) into one or more slices where each slice can include one or more slice segments. A slice segment is organized into coding units, prediction units, and transform units. The HEVC specification distinguishes between "blocks" and "units," where a "block" addresses a specific area in a sample array (for example, luma, Y), and the "unit" includes the collocated blocks of all encoded color components (Y, Cb, Cr, or monochrome), syntax elements, and prediction data that are associated with the blocks (for example, motion vectors).

For coding in HEVC, a picture is partitioned into coding tree blocks (CTB) of square shape with a configurable size, and a consecutive set of coding tree blocks is grouped into a slice. A Coding Tree Unit (CTU) contains the CTBs of the encoded color components. A CTB is the root of a quadtree partitioning into Coding Blocks (CB), and a Coding Block may be partitioned into one or more Prediction Blocks (PB) and forms the root of a quadtree partitioning into Transform Blocks (TBs). Corresponding to the Coding Block, Prediction Block, and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB, and TB of the luma component applies to the corresponding CU, PU, and TU. In the present application, the term "block" can be used to refer, for example, to any of CTU, CU, PU, TU, CB, PB, and TB. In addition, the "block" can also be used to refer to a macroblock and a partition as specified in H.264/AVC or other video coding standards, and more generally to refer to an array of data of various sizes.

In the example of encoder 100, a picture is encoded by the encoder elements as described below. The picture to be encoded is processed in units of CUs. Each CU is encoded using either an intra or inter mode. When a CU is encoded in an intra mode, it performs intra prediction (160). In an inter mode, motion estimation (175) and compensation (170) are performed. The encoder decides (105) which one of the intra mode or inter mode to use for encoding the CU and indicates the intra/inter decision by a prediction mode flag. Prediction residuals are calculated by subtracting (110) the predicted block from the original image block.

CUs in intra mode are predicted from reconstructed neighboring samples within the same slice. A set of 35 intra prediction modes is available in HEVC, including a DC, a planar, and 33 angular prediction modes. The intra prediction reference is reconstructed from the row and column adjacent to the current block. The reference extends over two times the block size in the horizontal and vertical directions using available samples from previously reconstructed blocks. When an angular prediction mode is used for intra prediction, reference samples can be copied along the direction indicated by the angular prediction mode.

The applicable luma intra prediction mode for the current block can be coded using two different options. If the applicable mode is included in a constructed list of six most probable modes (MPM), the mode is signaled by an index in the MPM list. Otherwise, the mode is signaled by a fixed-length binarization of the mode index. The six most probable modes are derived from the intra prediction modes of the top and left neighboring blocks (see table 1 below).

TABLE 1

| | Conditions | MPM[0] | MPM[1] | MPM[2] | MPM[3] | MPM[4] | MPM[5] |
|---|---|---|---|---|---|---|---|
| L = A | L ≠ PLANAR _IDX and L ≠ DC_IDX | PLANAR_IDX | L | L − 1 | L + 1 | DC_IDX | L − 2 |
| | Otherwise | PLANAR_IDX | DC_IDX | VER_IDX | HOR_IDX | VER_IDX − 4 | VER_IDX + 4 |
| L ≠ A | L > DC _IDX and A > DC_IDX | PLANAR_IDX | L | A | DC_IDX | Max(L, A) − 2, if L and A are adjacent else max(L, A) − 1 | Max(L, A) + 2, if L and A are adjacent else max(L, A) + 1 |

TABLE 1-continued

| Conditions | | MPM[0] | MPM[1] | MPM[2] | MPM[3] | MPM[4] | MPM[5] |
|---|---|---|---|---|---|---|---|
| Otherwise | L + A >= 2 | PLANAR_IDX | Max(L, A) | DC_IDX | Max(L, A) − 1 | Max(L, A) + 1 | Max(L, A) − 2 |
| | otherwise | PLANAR_IDX | DC_IDX | VER_IDX | HOR_IDX | VER_IDX − 4 | VER_IDX + 4 |

For an inter CU, The motion information (for example, motion vector and reference picture index) can be signaled in multiple methods, for example "merge mode" or "advanced motion vector prediction (AMVP)".

In the merge mode, a video encoder or decoder assembles a candidate list based on already coded blocks, and the video encoder signals an index for one of the candidates in the candidate list. At the decoder side, the motion vector (MV) and the reference picture index are reconstructed based on the signaled candidate.

In AMVP, a video encoder or decoder assembles candidate lists based on motion vectors determined from already coded blocks. The video encoder then signals an index in the candidate list to identify a motion vector predictor (MVP) and signals a motion vector difference (MVD). At the decoder side, the motion vector (MV) is reconstructed as MVP+MVD. The applicable reference picture index is also explicitly coded in the CU syntax for AMVP.

The prediction residuals are then transformed (125) and quantized (130), including at least one embodiment for adapting the chroma quantization parameter described below. The transforms are generally based on separable transforms. For instance, a DCT transform is first applied in the horizontal direction, then in the vertical direction. In recent codecs such as the JEM, the transforms used in both directions may differ (for example, DCT in one direction, DST in the other one), which leads to a wide variety of 2D transforms, while in previous codecs, the variety of 2D transforms for a given block size is usually limited.

The quantized transform coefficients, as well as motion vectors and other syntax elements, are entropy coded (145) to output a bitstream. The encoder may also skip the transform and apply quantization directly to the non-transformed residual signal on a 4×4 TU basis. The encoder may also bypass both transform and quantization, that is, the residual is coded directly without the application of the transform or quantization process. In direct PCM coding, no prediction is applied and the coding unit samples are directly coded into the bitstream.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture, for example, to perform deblocking/SAO (Sample Adaptive Offset) filtering to reduce encoding artifacts. The filtered image is stored at a reference picture buffer (180).

Figure 2:
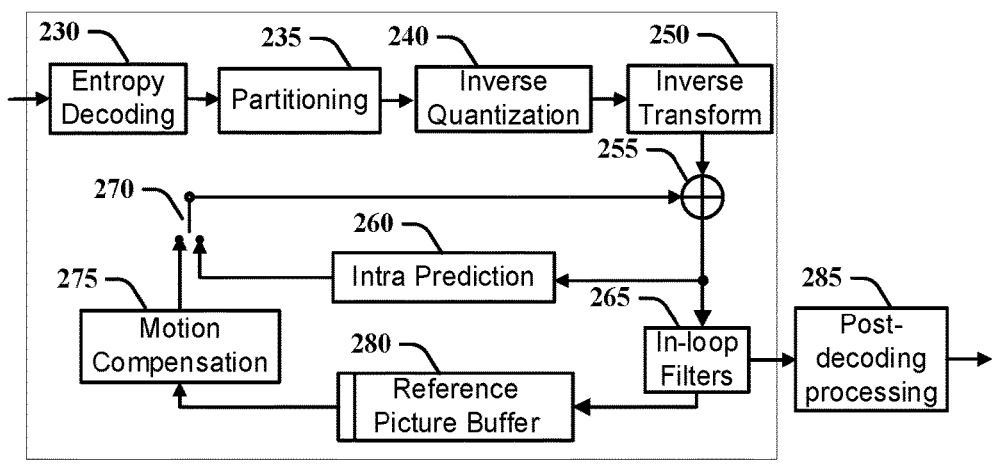
FIG. 2 illustrates a block diagram of an example of video decoder 200, such as an HEVC decoder.

FIG. 2 illustrates a block diagram of an example of video decoder 200, such as an HEVC decoder. In the example of decoder 200, a bitstream is decoded by the decoder elements as described below. Video decoder 200 generally performs a decoding pass reciprocal to the encoding pass as described in FIG. 1, which performs video decoding as part of encoding video data. FIG. 2 may also illustrate a decoder in which improvements are made to the HEVC standard or a decoder employing technologies similar to HEVC, such as a JEM decoder.

In particular, the input of the decoder includes a video bitstream, which may be generated by video encoder 100. The bitstream is first entropy decoded (230) to obtain transform coefficients, motion vectors, picture partitioning information, and other coded information. The picture partitioning information indicates the size of the CTUs, and a manner a CTU is split into CUs, and possibly into PUs when applicable. The decoder may therefore divide (235) the picture into CTUs, and each CTU into CUs, according to the decoded picture partitioning information. The transform coefficients are de-quantized (240) including at least one embodiment for adapting the chroma quantization parameter described below and inverse transformed (250) to decode the prediction residuals.

Combining (255) the decoded prediction residuals and the predicted block, an image block is reconstructed. The predicted block may be obtained (270) from intra prediction (260) or motion-compensated prediction (that is, inter prediction) (275). As described above, AMVP and merge mode techniques may be used to derive motion vectors for motion compensation, which may use interpolation filters to calculate interpolated values for sub-integer samples of a reference block. In-loop filters (265) are applied to the reconstructed image. The filtered image is stored at a reference picture buffer (280).

The decoded picture can further go through post-decoding processing (285), for example, an inverse color transform (for example conversion from YCbCr 4:2:0 to RGB 4:4:4) or an inverse remapping performing the inverse of the remapping process performed in the pre-encoding processing (101). The post-decoding processing may use metadata derived in the pre-encoding processing and signaled in the bitstream.

Figure 3:
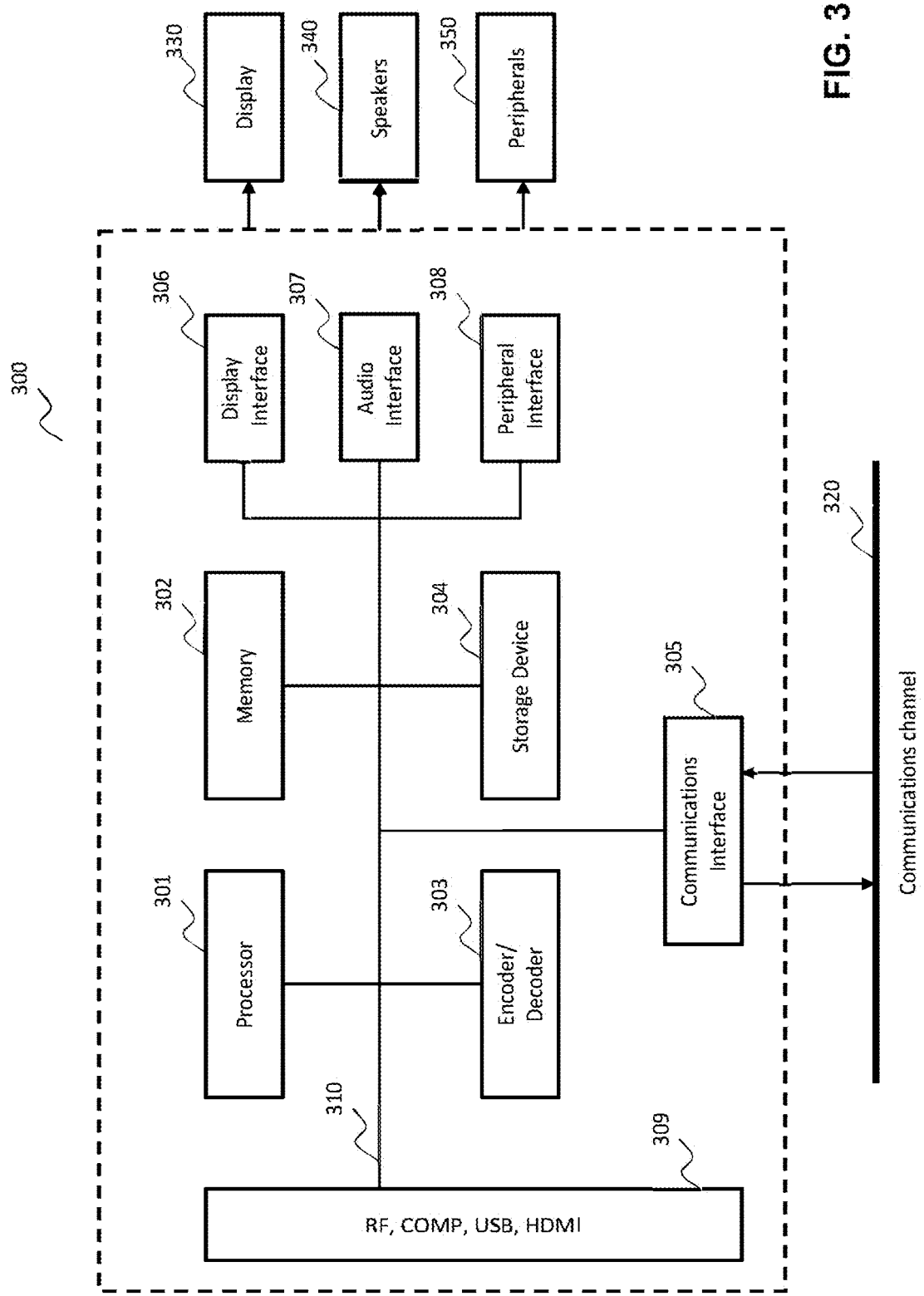
FIG. 3 illustrates a block diagram of an example of a system in which various aspects and embodiments are implemented.

FIG. 3 illustrates a block diagram of an example of a system in which various aspects and embodiments are implemented. System 300 can be embodied as a device including the various components described below and is configured to perform one or more of the aspects described in this application. Examples of such devices include, but are not limited to, various electronic devices such as personal computers, laptop computers, smartphones, tablet computers, digital multimedia set top boxes, digital television receivers, personal video recording systems, connected home appliances, encoders, transcoders, and servers. Elements of system 300, singly or in combination, can be embodied in a single integrated circuit, multiple ICs, and/or discrete components. For example, in at least one embodiment, the processing and encoder/decoder elements of system 300 are distributed across multiple ICs and/or discrete components. In various embodiments, the elements of system 300 are communicatively coupled through an internal bus 310. In various embodiments, the system 300 is communicatively coupled to other similar systems, or to other electronic devices, via, for example, a communications bus or through dedicated input and/or output ports. In various embodiments, the system 300 is configured to implement one or more of the aspects described in this document, such as the video encoder 100 and video decoder 200 described above and modified as described below.

The system 300 includes at least one processor 301 configured to execute instructions loaded therein for implementing, for example, the various aspects described in this document. Processor 301 can include embedded memory, input output interface, and various other circuitries as known in the art. The system 300 includes at least one memory 302 (e.g., a volatile memory device, and/or a non-volatile memory device). System 300 includes a storage device 304, which can include non-volatile memory and/or volatile memory, including, but not limited to, EEPROM, ROM, PROM, RAM, DRAM, SRAM, flash, magnetic disk drive, and/or optical disk drive. The storage device 304 can include an internal storage device, an attached storage device, and/or a network accessible storage device, as non-limiting examples.

System 300 includes an encoder/decoder module 303 configured, for example, to process data to provide an encoded video or decoded video, and the encoder/decoder module 303 can include its own processor and memory. The encoder/decoder module 303 represents module(s) that can be included in a device to perform the encoding and/or decoding functions. As is known, a device can include one or both of the encoding and decoding modules. Additionally, encoder/decoder module 303 can be implemented as a separate element of system 300 or can be incorporated within processor 301 as a combination of hardware and software as known to those skilled in the art.

Program code to be loaded onto processor 301 or encoder/decoder 303 to perform the various aspects described in this document can be stored in storage device 304 and subsequently loaded onto memory 302 for execution by processor 301. In accordance with various embodiments, one or more of processor 301, memory 302, storage device 304, and encoder/decoder module 303 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In several embodiments, memory inside of the processor 301 and/or the encoder/decoder module 303 is used to store instructions and to provide working memory for processing that is needed during encoding or decoding. In other embodiments, however, a memory external to the processing device (for example, the processing device can be either the processor 301 or the encoder/decoder module 303) is used for one or more of these functions. The external memory can be the memory 302 and/or the storage device 304, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC.

The input to the elements of system 300 can be provided through various input devices as indicated in block 309. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 309 have associated respective input processing elements as known in the art. For example, the RF portion can be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 300 to other electronic devices across USB and/or HDMI connections. It is to be understood that various aspects of input processing, for example, Reed-Solomon error correction, can be implemented, for example, within a separate input processing IC or within processor 301 as necessary. Similarly, aspects of USB or HDMI interface processing can be implemented within separate interface ICs or within processor 301 as necessary. The demodulated, error corrected, and demultiplexed stream is provided to various processing elements, including, for example, processor 301, and encoder/decoder 303 operating in combination with the memory and storage elements to process the data-stream as necessary for presentation on an output device.

Various elements of system 300 can be provided within an integrated housing, Within the integrated housing, the various elements can be interconnected and transmit data therebetween using suitable connection arrangement, for example, an internal bus as known in the art, including the I2C bus, wiring, and printed circuit boards.

The system 300 includes communication interface 305 that enables communication with other devices via communication channel 320. The communication interface 305 can include, but is not limited to, a transceiver configured to transmit and to receive data over communication channel 320. The communication interface 305 can include, but is not limited to, a modem or network card and the communication channel 320 can be implemented, for example, within a wired and/or a wireless medium.

Data is streamed to the system 300, in various embodiments, using a Wi-Fi network such as IEEE 802.11. The Wi-Fi signal of these embodiments is received over the communications channel 320 and the communications interface 305 which are adapted for Wi-Fi communications. The communications channel 320 of these embodiments is typically connected to an access point or router that provides access to outside networks including the Internet for allowing streaming applications and other over-the-top communications. Other embodiments provide streamed data to the system 300 using a set-top box that delivers the data over the HDMI connection of the input block 309. Still other embodiments provide streamed data to the system 300 using the RF connection of the input block 309.

The system 300 can provide an output signal to various output devices, including a display 330, speakers 340, and other peripheral devices 350. The other peripheral devices 350 include, in various examples of embodiments, one or more of a stand-alone DVR, a disk player, a stereo system, a lighting system, and other devices that provide a function based on the output of the system 300. In various embodiments, control signals are communicated between the system 300 and the display 330, speakers 340, or other peripheral devices 350 using signaling such as AV.Link, CEC, or other communications protocols that enable device-to-device control with or without user intervention. The output devices can be communicatively coupled to system 300 via dedicated connections through respective interfaces 306, 307, and 308. Alternatively, the output devices can be connected to system 300 using the communications channel 320 via the communications interface 305. The display 330 and speakers 340 can be integrated in a single unit with the other components of system 300 in an electronic device such as, for example, a television. In various embodiments, the display interface 306 includes a display driver, such as, for example, a timing controller (T Con) chip.

The display 330 and speaker 340 can alternatively be separate from one or more of the other components, for example, if the RF portion of input 309 is part of a separate set-top box. In various embodiments in which the display 330 and speakers 340 are external components, the output signal can be provided via dedicated output connections, including, for example, HDMI ports, USB ports, or COMP outputs. The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Figures 4, 5:
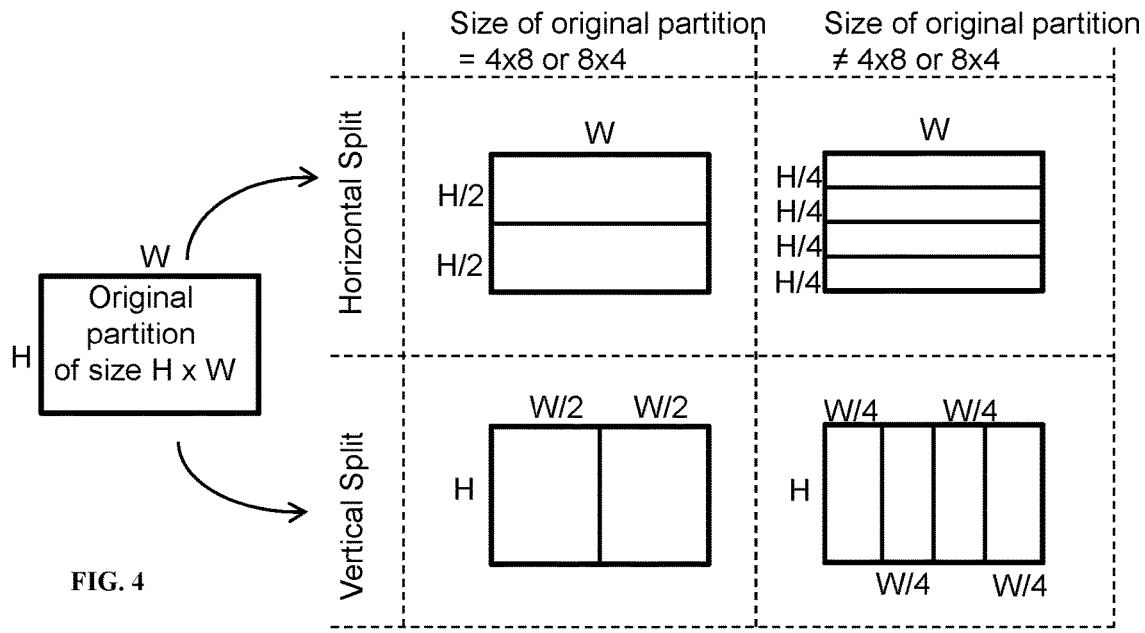
FIG. 4 illustrates an example of possible intra sub partition (ISP) mode.
FIG. 5 illustrates an example of pre-defined pair of transforms used in ISP mode.

FIG. 4 illustrates an example of possible intra sub partition (ISP) mode. The ISP mode is used for intra-prediction and comprises splitting a coding unit into 2 or 4 transform units of same sizes. This split is performed horizontally or vertically. The splitting depends on the block size, as shown in Table 2. Basically, a 4×4 cannot be split. A CU of size 4×8 or 8×4 is split into 2 TUs. Other CUs are split into 4 TUs.

TABLE 2

| Block Size (Height × Width) | Number of Sub-Partitions |
|---|---|
| 4 × 4 | Not divided |
| 4 × 8 and 8 × 4 | 2 |
| All other cases | 4 |

Inside a CU coded using ISP mode, TU are decoded sequentially, and are intra-predicted from TU to TU using the same intra prediction mode, which is signaled at the CU level. Finally, the residual coding is also adapted according to the intra sub-partitions sizes. Indeed, sub-partitions may be of size 1×N, N×1, 2×N or N×2, coding group of size 1×16, 16×1, 2×8 or 8×2 are used in these respective cases.

The ISP coding mode can be signaled for example through two successive flags:
  The intra_subpartitions_mode_flag indicates the use of ISP mode for a given Intra CU.
  The intra_subpartitions_split_flag indicates the orientation of the split into intra sub-partition, where 0 indicates a horizontal split and 1 a vertical split, when the splitting direction cannot be directly inferred from the CU size.

FIG. 5 illustrates an example of pre-defined pair of transforms used in ISP mode. Indeed, when ISP is used for a given intra CU, then a pre-defined pair of transforms is used to code and decode each of the (2 or 4) TUs contained in that CU. The transform pair are chosen as a combination between DCT2 and DST7 applied along horizontal or vertical directions according to the dimension of the transform block. Namely, the horizontal (trTypeHor) and vertical (trTypeVer) transforms are selected as follows:

$$trTypeHor=(Width>=4\ \&\&\ Width<=16)?DST7:DCT2$$

$$trTypeVer=(Height>=4\ \&\&\ Height<=16)?DST7:DCT2$$

This type of selection creates a set of 4 different pairs, which are the combinations between DCT2 and DST7 as shown in FIG. 5. The separable transform applied on a transform unit is called the primary transform.

In addition to the primary transform, a so-called low-frequency non-separable transform (LFNST, formerly known as non-separable secondary transform (NSST)) may be applied in some cases on a subset of the transform coefficient issued from the primary transform. LFNST increases the coding efficiency of the video codec. Two LFNST transform sets can be defined: one for large residual blocks and one for small residual blocks. For each set, 4 groups of transforms are defined, where each group contains 2 transform matrices. The selection of the group depends on the intra-prediction mode, and the transform index, called LFNST index in the following, is coded in the bitstream. Unlike the primary transforms, LFSNT is a trained transform obtained by learning from some large dataset residual data. However, conventionally, the LFNST secondary transform is not applied in the case of an INTRA CU coded in ISP mode.

On the decoder side, the inverse LFNST transform takes place after the inverse quantization and before the inverse primary transform, between steps 240 and 250 of FIG. 2. On the encoder, LFNST takes place between the forward primary transform and the quantization stage, between steps 125 and 130 of FIG. 1. The LFNST can take the form of two possible non-separable transforms: the 4×4 LFNST and the 8×8 LFNST. The 4×4 LFNST is applied for small block, i.e.

blocks for which min(width,height)<8, where width and height denote the width and height of the block. The 8×8 LFNST are applied to larger block, i.e. blocks for which min(width,height)>4.

The forward 4×4 LFNST is applied as follows. It is applied onto the 4×4 lowest frequency subblock of the considered transform block. The input 16 coefficient are represented as a 16×1 vector $\vec{X}$. The LFNST transform consist in the following operation:

$$\vec{F} = T \times \vec{X}$$

where T is a 16×16 matrix, and $\vec{F}$ is the output transform 16×1 vector. $\vec{F}$ is then re-organized as a 4×4 sub-block, which become the lowest frequency coding group in scanning order.

Concerning larger blocks, the 8×8 LFNST is applied as follows. It takes as input the 3 top-left transform 4×4 sub-block is the forward primary transformed block. This thus corresponds to 48 transform coefficients. The LFNST is then applied to the 48 lowest frequency coefficients in scanning order, organized in a 48×1 vector ($X_{48}$) of coefficients. Thus, the forward LFNST takes the following form:

$$\vec{F} = T_{16 \times 48} \times \vec{X_{48}}$$

On the decoder side, the 48×16 transpose matrix of T_16×48 is applied on the inverse quantized coefficients to perform the inverse LFNST transform.

Four sets of LFNST transforms can be used, respectively for the 4×4 LFNST and 8×8 LFNST. These sets are defined based on the intra prediction mode. For each set, 2 LFNST transform matrices (kernels) can be used. The transform matrix used is signaled through the LFNST index syntax element.

Embodiments described hereafter have been designed with the foregoing in mind.

In at least one embodiment, a secondary transform is used for the transform units of a coding unit in intra sub-block partition mode. This allows to increase the efficiency of the compression by further compacting the energy of transform coefficients towards low-frequency bands, making the entropy coding of the quantized transformed residual block even more efficient. Different embodiments are described hereunder based on this principle with some variants.

Figure 6A:
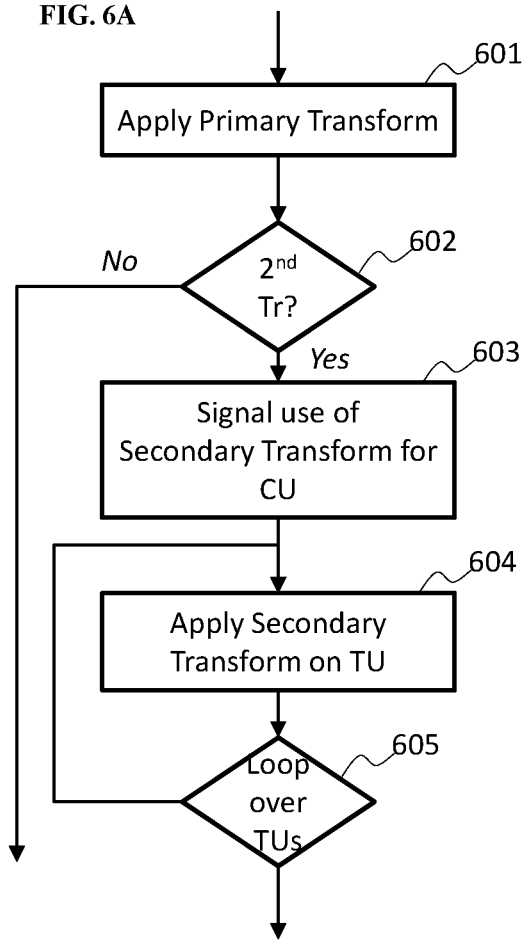
FIG. 6A illustrates at high-level an example embodiment of encoding process when using a secondary transform in intra sub-block partition mode.

FIG. 6A illustrates at high-level an example embodiment of encoding process when using a secondary transform in intra sub-block partition mode. This embodiment is for example executed by the processor 301 of FIG. 3. First, in step 601, the processor 301 applies a primary transform to the coding unit. In step 602, the processor checks whether a secondary transform should be used. In at least one embodiment, the secondary transform is LFNST (as detailed in FIG. 6C for example) and the test is the conventional test of applicability of LFNST. In at least one embodiment, the test of step 602 is performed according to the process of FIG. 6D or FIG. 6E. When no secondary transform should be used, the process ends, and the coding unit can be encoded conventionally. When no secondary transform should be used, the process signals the use of a secondary transform for the coding unit in step 603. Then, in step 604, the secondary transform is determined and applied on a transform unit. Step 604 is iterated for all transform units of the coding unit. When all transform units have been processed, in step 605, the process ends, and the coding unit can be encoded conventionally.

Signaling the use of a secondary transform can be done through different mechanisms. In one example embodiment, a dedicated flag is used. In another embodiment, an index is used, the index having a value that identifies the transform to be used from a list of transforms and the zero value corresponding to the case where no secondary transform is used.

Figure 6B:
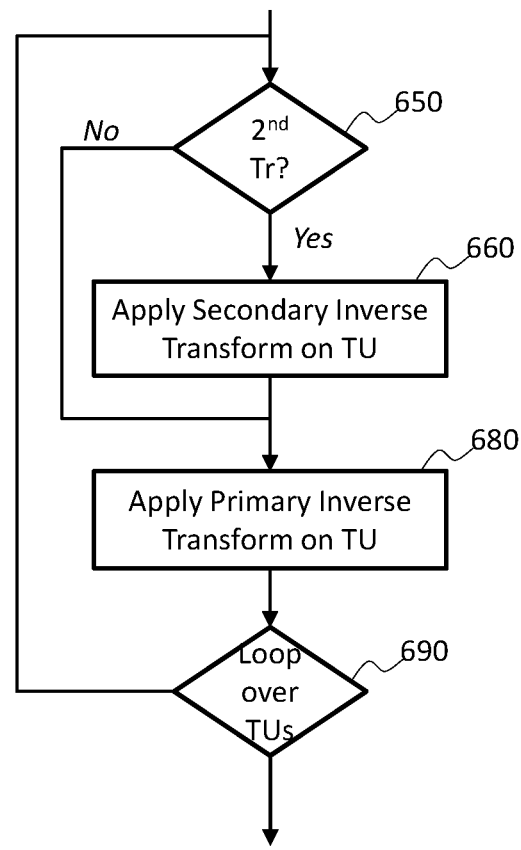
FIG. 6B illustrates at high-level an example embodiment of decoding process when using a secondary transform in intra sub-block partition mode.

FIG. 6B illustrates at high-level an example embodiment of decoding process when using a secondary transform in intra sub-block partition mode. This embodiment is for example executed by the processor 301 of FIG. 3. First, in step 650, the processor checks whether a secondary transform is signaled and should be used. In at least one embodiment, the secondary transform is LFNST (as detailed in FIG. 6C for example) and the test is the conventional test of applicability of LFNST. In at least one embodiment, the test of step 650 is performed according to the process of FIG. 6D or FIG. 6E. When it is the case, in step 660, a secondary transform is determined and applied on the transform unit of the coding unit. In step 680, the primary inverse transform is performed on the transform unit and in step 690, the process iterates from step 650 until all TUs have been processed. Then the decoding process continues conventionally to finalize the decoding.

Figure 6C:
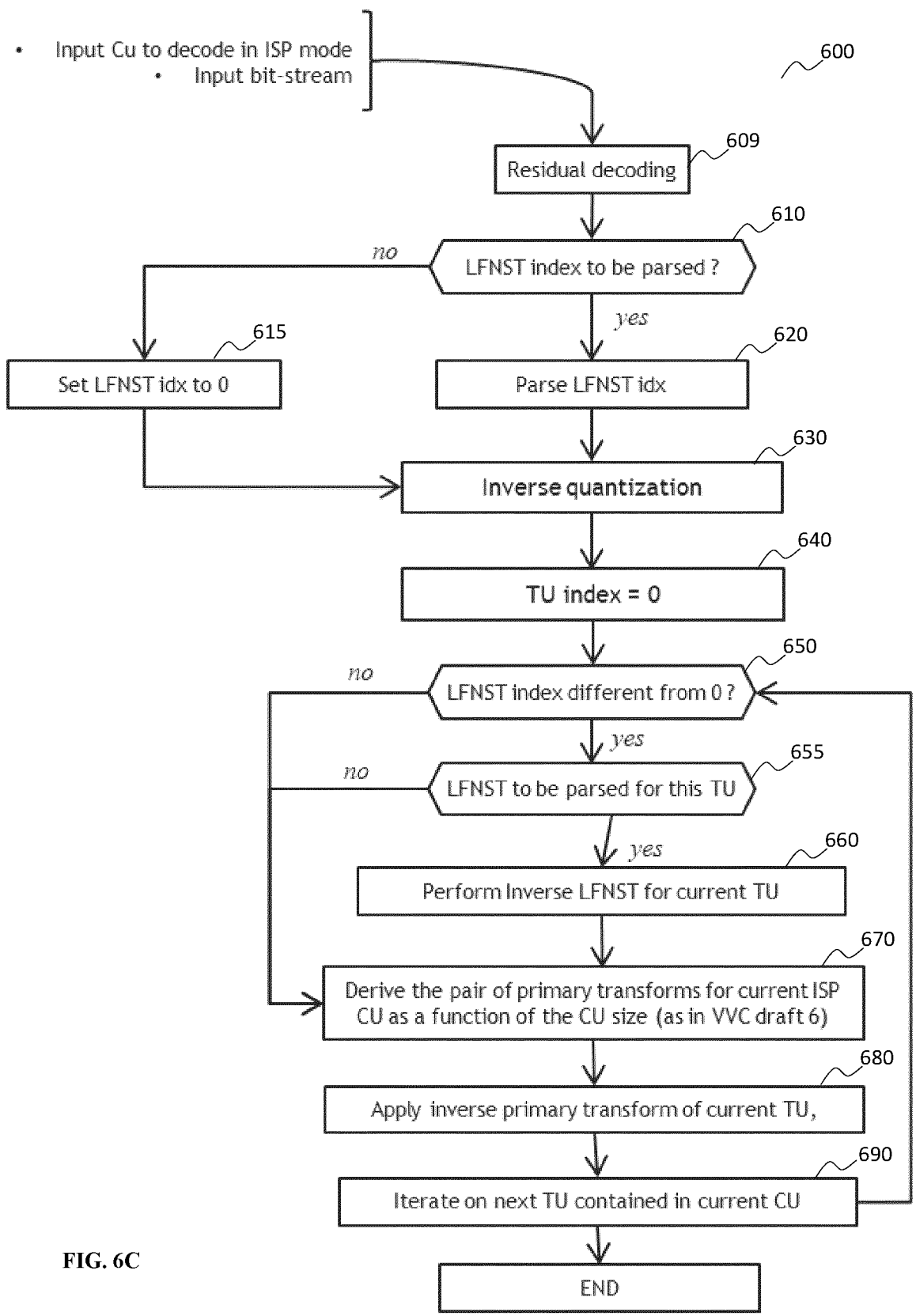
FIG. 6C illustrates an example embodiment of decoding process of an INTRA CU coded in intra sub-block partition mode and that uses LFNST as secondary transform.

FIG. 6C illustrates an example embodiment of decoding process of an INTRA CU coded in intra sub-block partition mode and that uses LFNST as secondary transform. This embodiment is for example executed by the processor 301 of FIG. 3. According to at least one embodiment, the secondary transform to be used for an INTRA CU coded in intra sub-block partition mode is LNFST and its use is signaled through an index LFNST idx: when the index is zero, LNFST is not used, when different from zero, then the index indicates which transform should be used in a list of transforms.

First, in step 609, the residuals are decoded. In step 610, the processor checks whether the LFNST index is to be parsed for the CU. This test involves testing individually whether the LFNST index is to be parsed for the TUs of the CU. An OR alternative for this test is described in FIG. 6D and an AND alternative is described in FIG. 6E. The conditions regarding the decision whether the LFNST index is to be parsed for a TU are the same as the ones used conventionally:

The CU size in the considered component is at least 4 in width and height;

LFNST is enabled on the SPS level;

The number of significant coefficients in the CU is strictly higher than 1 in the dual tree case, or strictly higher than 2 in the single tree case;

No non-zero quantized coefficient exists in a TU of the considered CU, in a 4×4 coding group other than the lowest frequency 4×4 coding group for a transform block of size at least 4×4, or with a scanning position greater than 7 in a square transform block of size equal to 4 or 8.

When LNFST is not to be used, then in step 615 the LFNST index is set to 0. That means that no LFNST is applied for the considered CU and thus no LFNST is applied in any TU contained in the considered CU.

In step 620, the LFNST index is parsed. If it is 0, then no LFNST is applied later. If it is different from 0, then the corresponding LFNST transform is later applied.

In step 630, inverse quantization is performed conventionally and an index to count the TUs is set to zero in step 640. In step 650, the LFNST index is tested and acts both as a flag indicating that LFNST is not used (when equal to 0)

and a value indicating which transform is to be used. If the LFNST index is different from 0, then the inverse LFNST (secondary transform) is performed in step 660 at the decoder side. This includes the 2 or 4 luma transform blocks contained in the considered CU, as well as the chroma transform block contained in the CU, in the case of the shared coding tree between luma and chroma components. Then, in step 670, the pair of primary transforms is determined conventionally, and the inverse primary transform is applied on current TU. In step 690, the process verifies that all TU have been processed before ending the process or iterating from step 650 when at least one TU has not been processed.

When applied to VVC, the embodiment of FIG. 6C requires an amendment of the coding unit syntax. This amendment is illustrated in Table 3 and identified by a grey background. It comprises removing the test regarding the IntraSubPartitionSplitType to authorize the use of LNFST also when IntraSubPartitionSplitType equals ISP NO SPLIT. As a result, a secondary transform is used in intra sub-block partition mode.

the secondary transform is identified according to the LNFST index and the inverse transform is performed in step 740 on the TU. In step 750, the inverse 2D DCT2 transform is performed on the TU. The process ends when all Tus have been processed.

Figure 8:
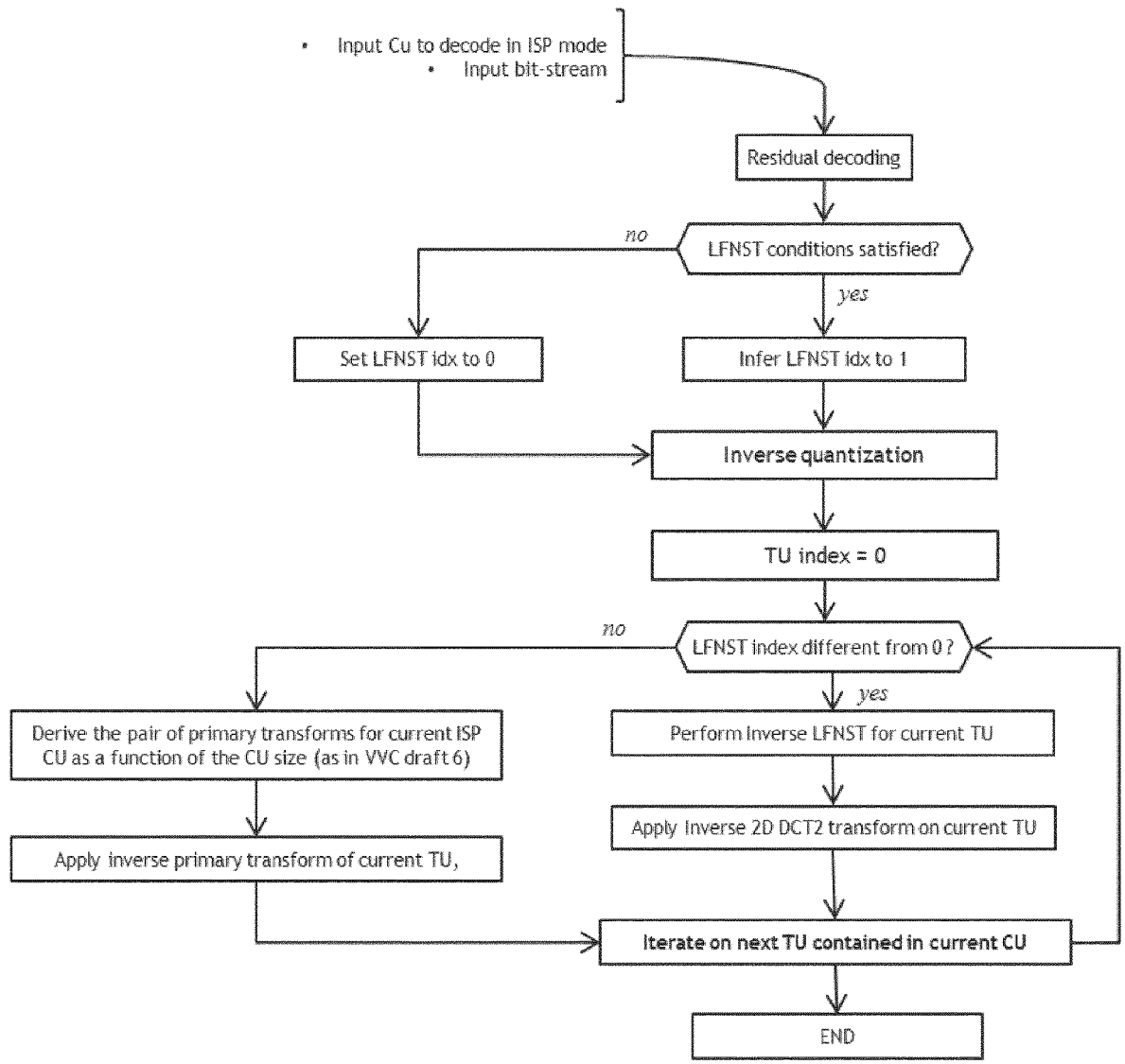
FIG. 8 illustrates an example embodiment of decoding process where the choice of secondary transform is predetermined.

FIG. 8 illustrates an example embodiment of decoding process where the choice of secondary transform is predetermined. In this embodiment, it is first verified if the conditions for LNFST are satisfied, as done conventionally for LNFST. When it is not the case, in step 810, then the LFNST index is set to 0. Otherwise, the LFNST index is set to 1. In other words, in this embodiment, the secondary transform is predetermined. The only choice is the first transform pair in the list. As in previous embodiment, when the secondary transform is used, the primary transform to be used is the 2D DCT2 pair.

In a variant of this embodiment, another LFNST index value may be inferred by the decoder in case of an intra CU coded in ISP mode in order to select another secondary transform.

Figure 9:
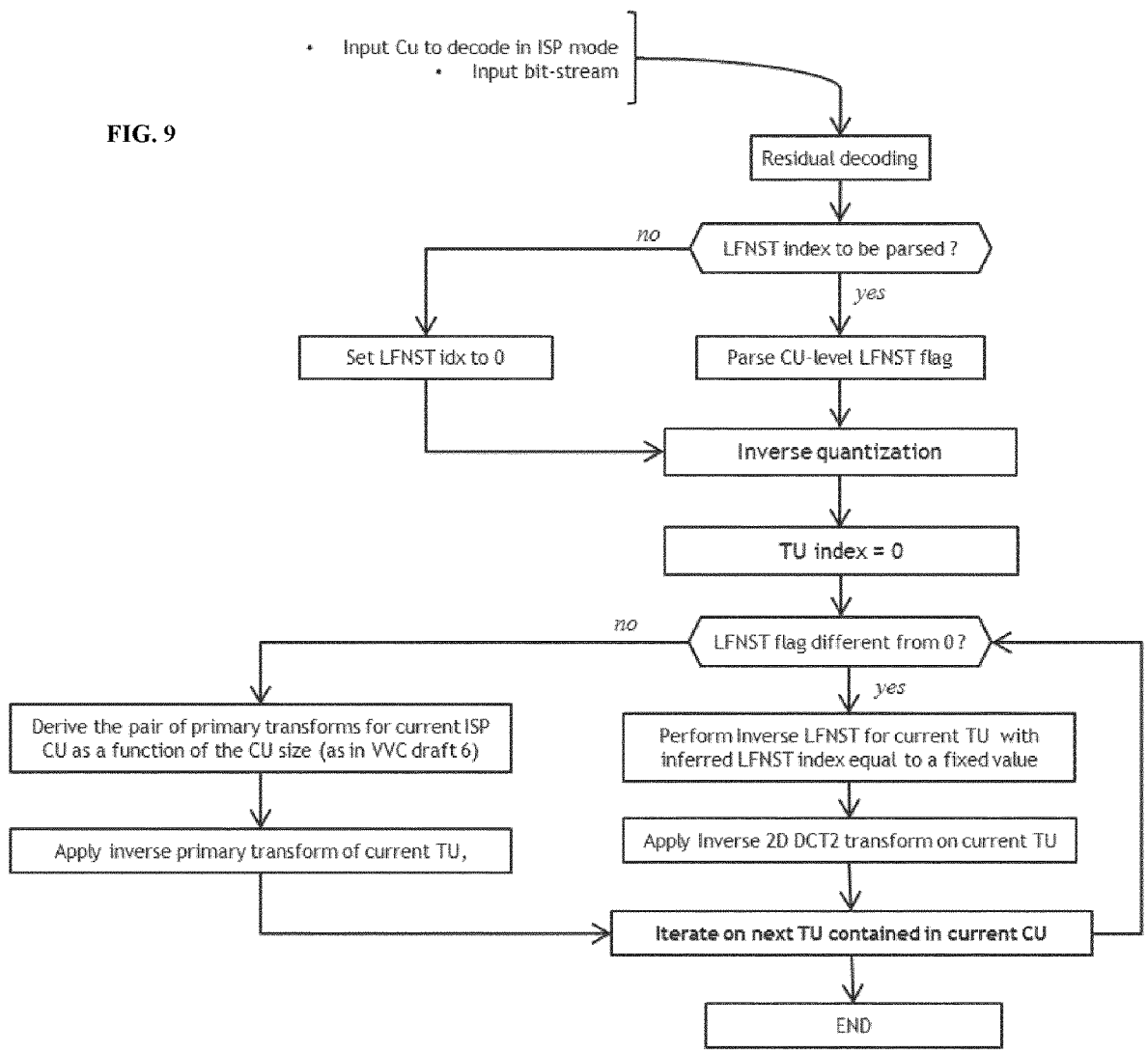
FIG. 9 illustrates an example embodiment of decoding process where the choice of secondary transform is predetermined and the use of secondary transform is signaled by a flag.

FIG. 9 illustrates an example embodiment of decoding process where the choice of secondary transform is prede-

TABLE 3

| | Descriptor |
|---|---|
| coding_unit( x0, y0, cbWidth, cbHeight, treeType, modeType ) { ..... if( cu_cbf ) { ..... if( Min( lfnstWidth, lfnstHeight) >= 4 && sps_lfnst_enabled_flag == 1 && CuPredMode[ x0 ][ y0 ] == MODE_INTRA && ~~IntraSubPartitionsSplitType~~ ~~==~~ ~~&&~~ ( !intra_mip_flag[ x0 ][ y0 ] \|\| Min( lfnstWidth, lfnstHeight ) >= 16 ) && tu_mts_idx[ x0 ][ y0 ] == 0 && Max( cbWidth, cbHeight ) <= MaxTbSizeY) { if( LfnstDcOnly == 0 && LfnstZeroOutSigCoeffFlag == 1 ) lfnst_idx[ x0 ][ y0 ] } } | ae(v) |

Figure 6D:
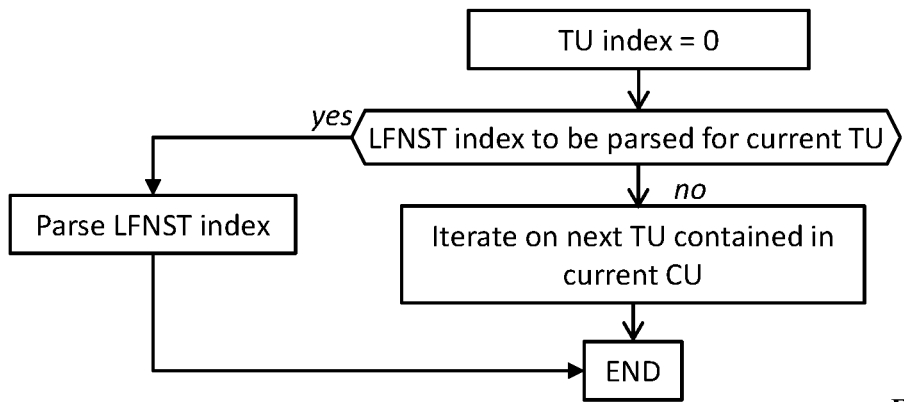
FIG. 6D and FIG. 6E illustrate example embodiments of the test whether the LFNST index should be parsed, respectively in "OR" or "AND" manner.
Figure 6E:
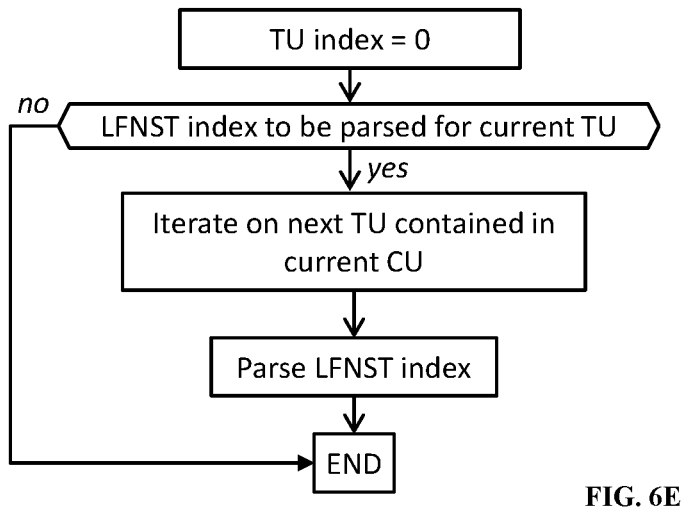

FIG. 6D and FIG. 6E illustrate example embodiments of the test whether the LFNST index should be parsed, respectively in "OR" or "AND" manner. This test is for example used in steps 602 of FIG. 6A, step 650 of FIG. 6B, steps 610 and 655 of FIG. 6C. The test of FIG. 6D operates in an "OR" manner so that as soon as a valid condition is detected for one of the TUs of the CU, the LFNST index is parsed. In contrary, the test of FIG. 6E operates in an "AND" manner so that as soon as a non valid condition is detected for one of the TUs of the CU, the LFNST index is not parsed, meaning that the conditions should be valid for all the TUs in order to parse the LFNST index.

Figure 7:
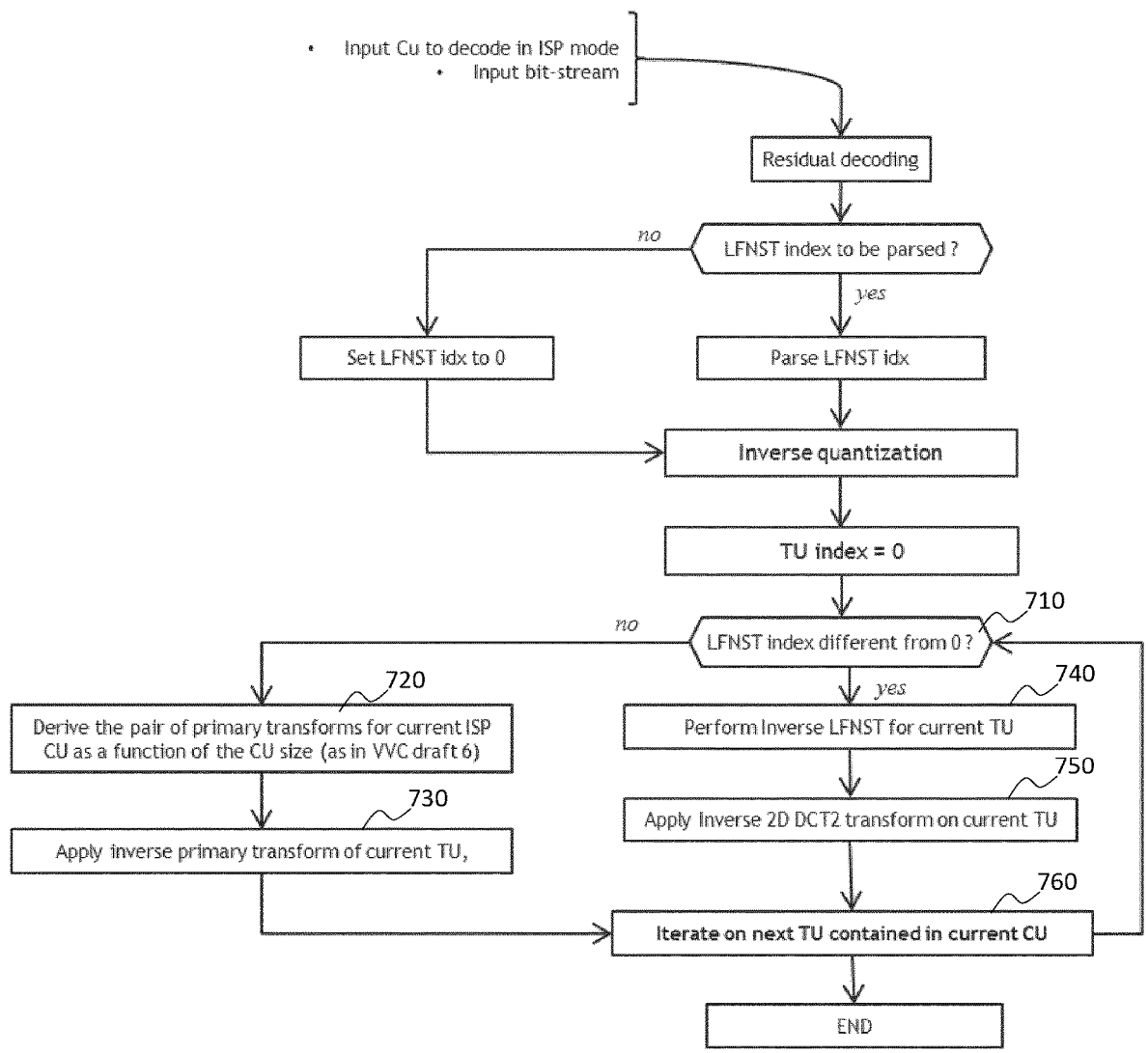
FIG. 7 illustrates an example embodiment of decoding process where the primary inverse transform used for each TU is derived based on the LFNST index associated to the considered CU coded in ISP mode.

FIG. 7 illustrates an example embodiment of decoding process where the primary inverse transform used for each TU is derived based on the LFNST index associated to the considered CU coded in ISP mode. In this embodiment, a loop is performed over each TU in the ISP intra CU and tests, whether a secondary transform is used. In this embodiment, this is done, in step 710, by testing the LFNST index. When LFNST index is zero, then no secondary transform was used at encoding for this CU. In this case, in step 720, the selection of the primary transform is performed conventionally using for example the table of FIG. 5. Then, in step 730, the selected primary transform is applied to the TU and the process continues to loop over the Tus in step 760. Back to step 710, when the LFNST index is different from 0, then a secondary transform is used in combination with the {DCT2,DCT2} pair for the primary transform. In this case, termined and the use of secondary transform is signaled by a flag. Whereas former embodiments used a value of LNFST index different from 0 to indicate the use of a secondary transform, this embodiment uses a dedicated flag to signal the usage of LFNST for an intra CU coded in ISP mode. In this case, when LFNST is used (flag set to true), then the LFNST index is inferred to a fixed value. In one example embodiment, this fixed value is equal to 1 to select the first transform pair. Similar to former embodiment, when LFNST is used, the 2D primary transform to be applied for current CU is inferred to DCT2_DCT2.

Figure 10:
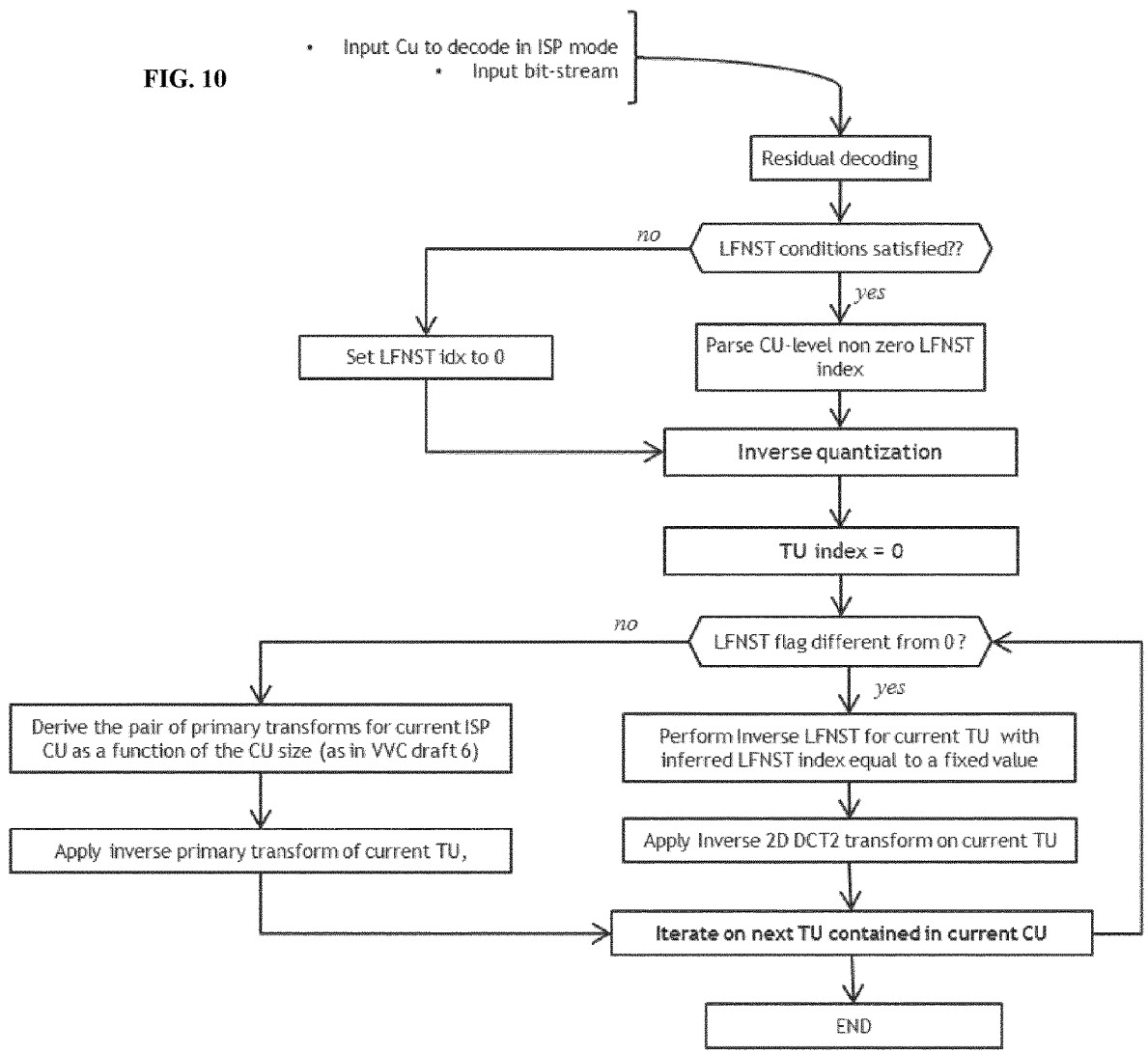
FIG. 10 illustrates an example embodiment of decoding process where the usage of secondary transform is implicit.

FIG. 10 illustrates an example embodiment of decoding process where the usage of secondary transform is implicit. In this variant of former embodiments of FIG. 7, FIG. 8 and FIG. 9, the usage of LFNST is implicit and the selection of the secondary transform is explicit, carried by the LFNST index. Moreover, the 2D primary transform is inferred to DCT2_DCT2 in case of an intra CU coded in ISP In at least one embodiment, the use of LFNST for an intra ISP CU depends on the size of the considered CU. For example, if the size in width and height of the CU is lower than a given threshold, then no LFNST is used for the considered CU. Indeed, the same constraint onto the CU size as for the matrix based intra-prediction (MIP) case could be imposed to allow the use of LFNST. When applied to VVC, this embodiment requires an amendment of the coding unit syntax as illustrated in Table 4 and highlighted by a grey background.

TABLE 4

| | Descriptor |
|---|---|
| coding_unit( x0, y0, cbWidth, cbHeight, treeType, modeType ) { .....   if( cu_cbf ) {     .....     if( Min( lfnstWidth, lfnstHeight ) >= 4 && sps_lfnst_enabled_flag == 1 &&       CuPredMode[ x0 ][ y0 ] == MODE_INTRA &&       (IntraSubPartitionsSplitType= =ISP_NO_SPLIT || (Min( lfnstWidth, lfnstHeight ) >= 8) &&       ( !intra_mip_flag[ x0 ][ y0 ] || Min( lfnstWidth, lfnstHeight ) >= 16 ) &&       tu_mts_idx[ x0 ][ y0 ] == 0 && Max( cbWidth, cbHeight ) <= MaxTbSizeY) {       if( LfnstDcOnly == 0 && LfnstZeroOutSigCoeffFlag == 1 )         lfnst_idx[ x0 ][ y0 ] | ae(v) |
|       }     }   } | |

According to a variant embodiment, LFNST is allowed if the CU size greater or equal to 16 in width and height, when the ISP mode is active for the considered CU.

According to a variant embodiment, LFNST is allowed if the CU size greater or equal to 32 in width and height, when the ISP mode is active for the considered CU.

Typically, the person skilled in the art will understand that LFNST, which has been designed for block sizes greater or equal to 4 in width and height, may perform well for CU sizes such that TU sizes are at least equal to 4 in width and height.

In at least one embodiment, the conditions to enable LFNST for an intra CU coded in ISP mode does depend on the size of the luma transform block issued from the CU split according to the ISP mode of the considered CU. Let's denote tbWidth and tbHeight the width and height of the luma transform block. In this proposed embodiment, LFNST may typically be enabled if the luma transform block size is at least 4 in with and height. When applied to VVC, this embodiment requires an amendment of the coding unit syntax as illustrated in Table 5 and highlighted by a grey background.

As a result of this embodiment, a different primary inverse transform may be used between the TUs contained in the considered CU. This may lead to increased coding efficiency over the former embodiments, since some flexibility is introduced in the assignment of the LFNST to each TU inside coding units coded in ISP mode. Therefore, the encoder has more freedom regarding rate distortion optimization to find the best coding mode to be used for an intra CU in ISP mode.

Figure 12A:
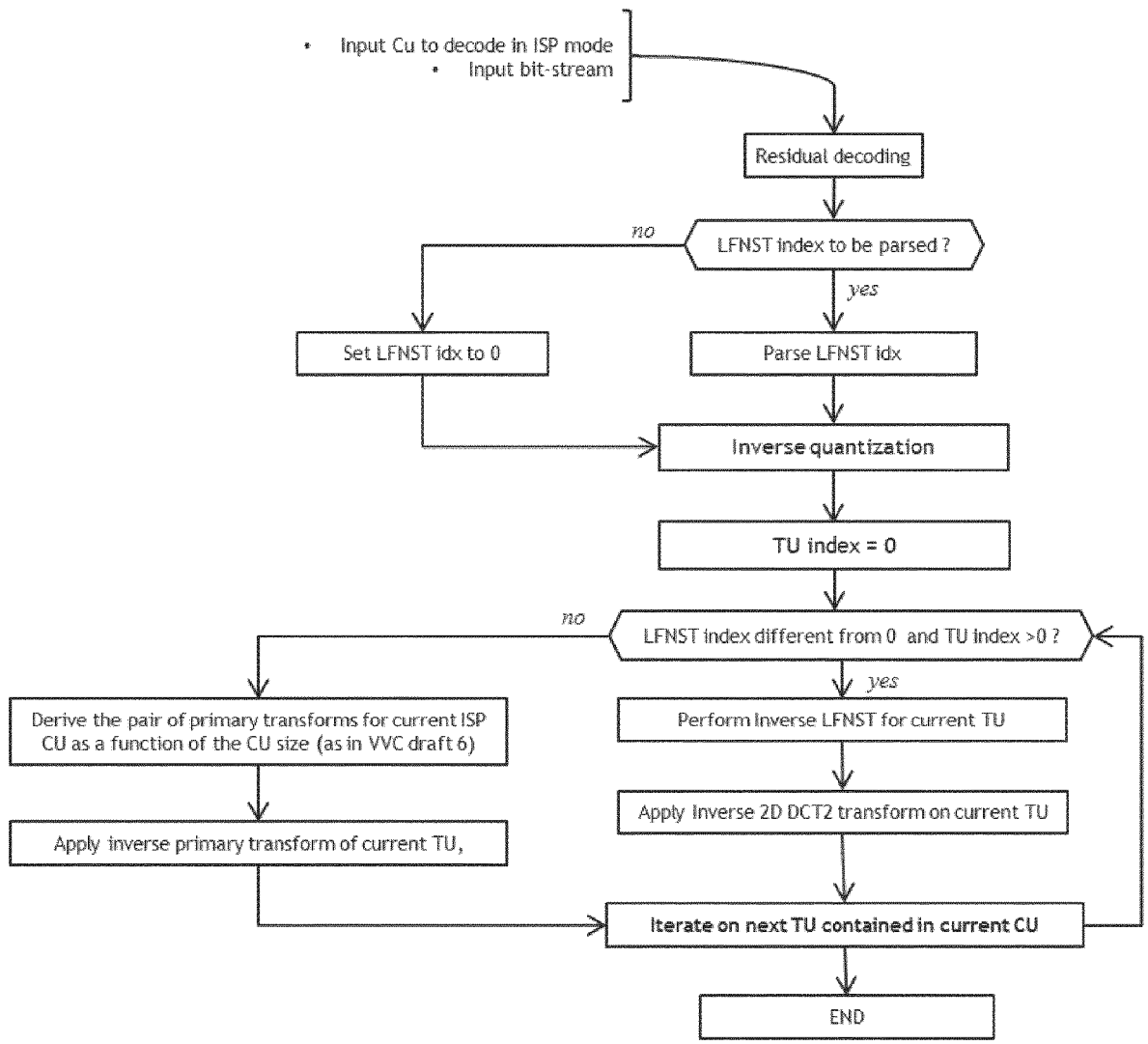
FIG. 12A and FIG. 12B illustrate example embodiments of decoding process where the usage of secondary transform is limited to a subset of the TU.
Figure 12B:
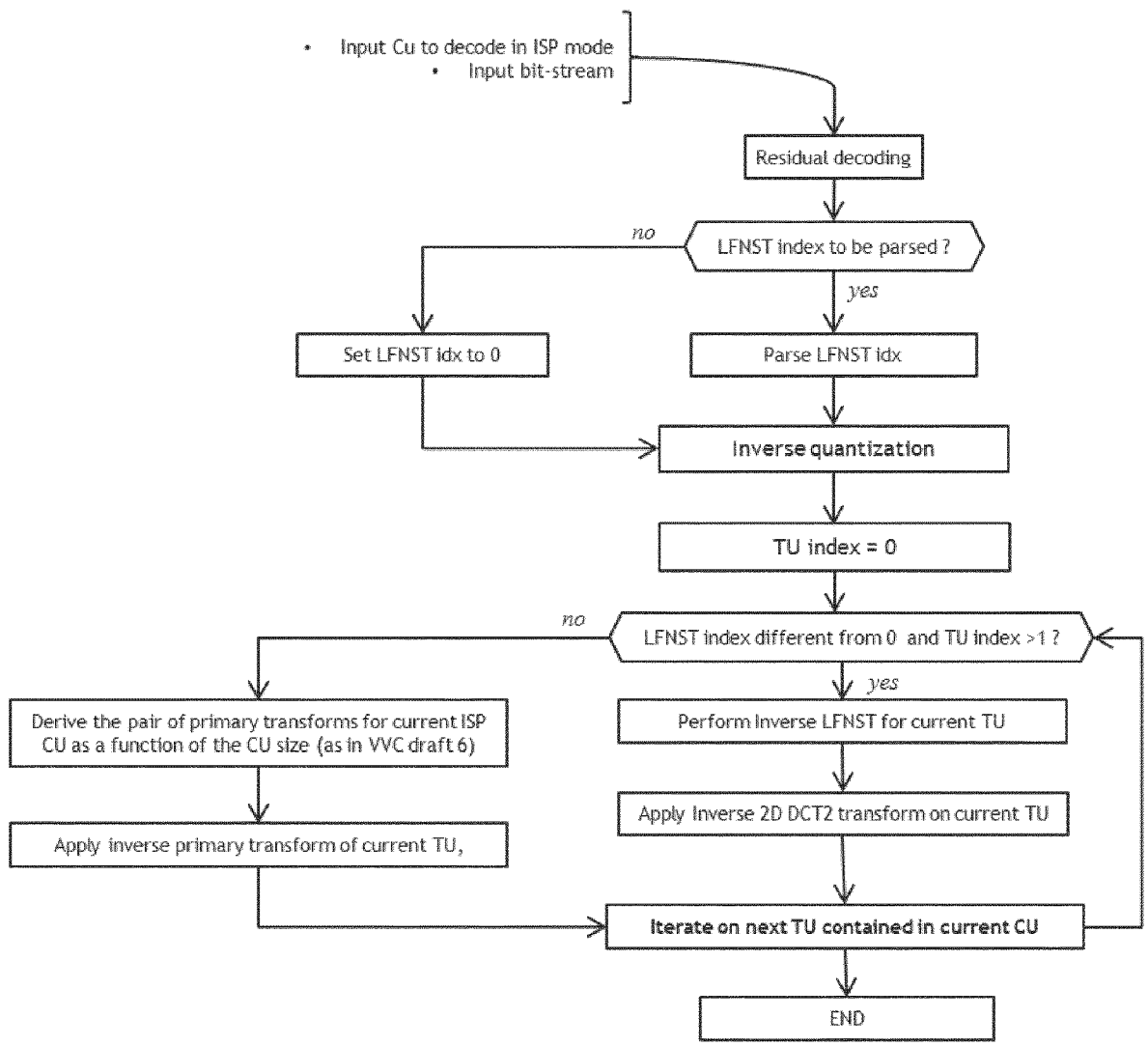

FIG. 12A and FIG. 12B illustrate example embodiments of decoding process where the usage of secondary transform is limited to a subset of the TU. According to these embodiments, the LFNST index is signaled on the TU-level inside intra ISP coding units, but for a subset of the TUs contained in the coding unit. In a first variant illustrated in FIG. 12A, LFNST is not allowed for the first TU of the CU and the conventional selection of transform may be used for this TU. however, for other Tus of the CU, LFNST is allowed and signaled as explained in the previous embodiment. In a second variant illustrated in FIG. 12B, LFNST is not allowed for the two first Tus of the CU and the conventional selection of transform may be used for this TU. however, for

TABLE 5

| | Descriptor |
|---|---|
| coding_unit( x0, y0, cbWidth, cbHeight, treeType, modeType ) { .....   if( cu_cbf ) {     .....     if( Min( lfnstWidth, lfnstHeight ) >= 4 && sps_lfnst_enabled_flag == 1 &&       CuPredMode[ x0 ][ y0 ] == MODE_INTRA &&       (IntraSubPartitionsSplitType= =ISP_NO_SPLIT || (Min( tbWidth, tbHeight ) >= 4 ) ) &&       ( !intra_mip_flag[ x0 ][ y0 ] || Min( lfnstWidth, lfnstHeight ) >= 16 ) &&       tu_mts_idx[ x0][ y0 ] == 0 && Max( cbWidth, cbHeight ) <= MaxTbSizeY) {       if( LfnstDcOnly == 0 && LfnstZeroOutSigCoeffFlag == 1 )         lfnst_idx[ x0 ][ y0 ] | ae(v) |
|       }     }   } | |

Figure 11:
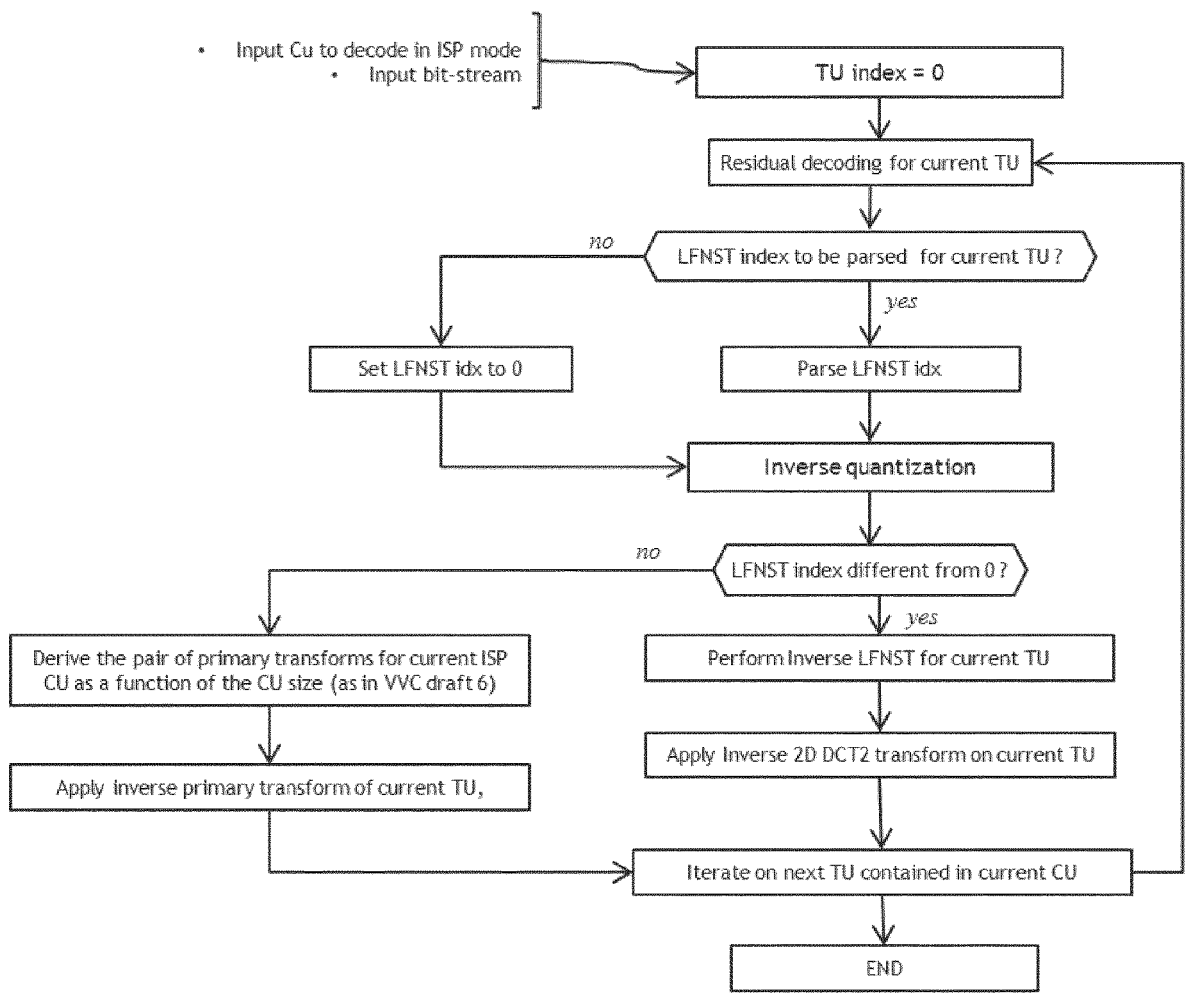
FIG. 11 illustrates an example embodiment of decoding process where the usage of secondary transform is done at the TU level.

FIG. 11 illustrates an example embodiment of decoding process where the usage of secondary transform is done at the TU level. In this embodiment, in case of an intra ISP coding unit, an LFNST index is signaled for each transform unit contained in the CU. The same conditions for signaling the use of LFNST are used as conventionally with the difference that the LFNST index is signaled on the TU level so that one LFNST index per TU is signaled. As can be seen in FIG. 11, in this embodiment, the loop over the TUs contained in the CU includes the parsing of the LFNST index for each TU.

other TUs of the CU, LFNST is allowed and signaled as explained in the previous embodiment.

Figure 13:
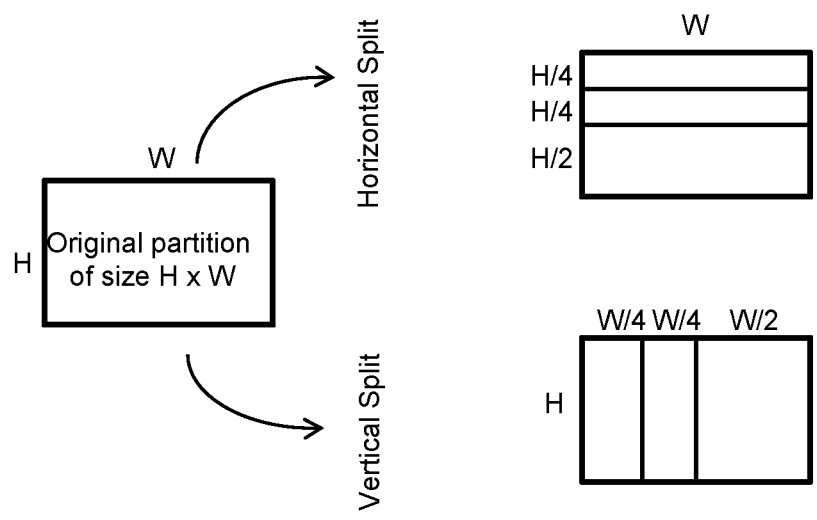
FIG. 13 illustrates an example embodiment where the splitting ratio between TUs inside the intra CU coded in ISP mode varies.

FIG. 13 illustrates an example embodiment where the splitting ratio between TUs inside the intra CU coded in ISP mode varies. In this embodiment, the ISP mode divides an intra CU into 3 TUs instead of 4. The TU sizes relative to the parent CU may then be ¼, ¼ and ½ along the considered splitting orientation, horizontal or vertical. In this embodiment, only the third TU uses LFNST. On the example shown in FIG. 13, the two first TUs have a size equal to a ¼ of the parent CU. Conventional selection of primary transform type is used for these TUs but no LFNST is used. The third TU has size equal to ½ of the CU size. For this last TU of the CU, DCT2 is used as the primary transform and LFNST is allowed. The LFNST index may be signaled either at the CU level or at the TU level as described in former embodiments.

In variant embodiments of the embodiments previously proposed, the large block 8×8 LFNST can be used to apply LFNST to TUs which have a size equal to half or ¼ of the considered CU size. In at least a further variant embodiment of the embodiments previously described, these 8×8 LFNST basis functions may also be applied to transform blocks of sizes 2×N, N×2, 1×N or N×1, N being an non-zero positive integer value.

In variant embodiments of the embodiments previously proposed, the constraints on the CU size are changed in order to increase the usage of LFNST for larger block (typically 8×8 blocks), using for example Table 6:

TABLE 6

| Block Size (Height × Width) | Number of Sub-Partitions |
| --- | --- |
| 4 × 4 | Not divided |
| 4 × 8 and 8 × 4 | 2 |
| 8 × 8 and 8 × 16 and 16 × 8 | 2 |
| All other cases | 4 |

In the new cases, the 8×16 and 16×8 cases are split implicitly such as the 2 resulting TU are of size 8×8.

In a variant embodiment, the conventional split decision of ISP is modified to favor LNFST on TU of at least four samples in both directions. In other words, ISP conditions are changed such as to forbid 1×N, N×1, 2×N and N×2.

In a further embodiment, the conditions to apply LFNST in the case of a CU coded in ISP mode are modified compared to the VVC draft 6 specification. Indeed, a TU is made of one or several transform blocks. In the case of VVC draft 6, several transform blocks are contained in a TU in the case of an intra CU coded in single tree configuration. Single tree means a single coding tree is used to partition a CTU into coding unit, for all luma and chroma components. Thus, a CU is made of a luma and 2 chroma coding blocks in this case. Moreover, a CU which is made of a single TU comprises a luma and 2 chroma transform blocks. In VVC draft 6, one condition to enable LFNST for such a CU is that at least one transform block in the CU contains a residual data where the last significant coefficient position, i.e. the position of the non-zero transform coefficient with the maximum scanning position in the transform block, is not the (0,0) position in the residual block.

In this proposed embodiment, an additional condition is added, which states that LFNST is enabled for a CU coded in ISP mode if all the luma transform blocks contained in the coding unit have a last significant coefficient position different from the coefficient position 0.

According to a further embodiment, the entropy coding of the LFNST index is modified according to the usage of ISP for a considered intra coding unit. In VVC draft 6, the LFNST is signaled by means of 2 binary elements (bins). The first bin indicates if the LFNST index is zero or not, i.e. it indicates if LFNST is used or not for the current CU. If the first bin is equal to 1, then the second bin indicates if the LFNST index is equal to 1 or 2. In VVC draft 6, the first bin is context-based coded. The CABAC context used depends on if the separate tree mode is used or not for the considered CU. According to the present embodiment, the context used to signal the first bin of the LFNST index also depends on if the ISP mode is off or on for the considered CU. Thus, the number of contexts used to code the first bin of the LFNST index is doubled compared to VVC draft 6 in this embodiment: 4 contexts are used instead of 2.

Moreover, according to a further variant, the initial condition probabilities associated to the added CABAC context are set to a value representative of a very low probability that LFNST index is different from 0, in the case of the Intra slice. Indeed, it has been observed that the proposed combination of LFNST and ISP coding mode brings a compression benefit in Inter picture, but the benefit tends to be much lower in intra pictures.

According to a further embodiment the combined use of LFNST and ISP is normatively enabled only for intra coding units which are coded in single tree mode.

According to a further embodiment the combined use of LFNST and ISP is normatively enabled only for intra coding units which are coded in INTRA slices.

According to a further embodiment, the combined use of LFNST and ISP is normatively enabled for all intra coding units whatever the single or dual tree mode, but this combination of mode is evaluated as a candidate mode by the encoder side rate distortion search only in the single tree case.

According to a further embodiment, the combined use of LFNST and ISP is normatively enabled for all intra coding units whatever the single or dual tree mode, but this combination of mode is evaluated as a candidate mode by the encoder side rate distortion search only in INTRA slices.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, the embodiments presented in figures FIG. 6B to FIG. 13.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, the embodiments of figures FIG. 6B to FIG. 13.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well. The aspects described and contemplated in this application can be implemented in many different forms. Figures FIG. 1, FIG. 2 and FIG. 3 above provide some embodiments, but other embodiments are contemplated, and the discussion of Figures does not limit the breadth of the implementations.

In the present application, the terms "reconstructed" and "decoded" may be used interchangeably, the terms "pixel" and "sample" may be used interchangeably, the terms "image," "picture" and "frame" may be used interchangeably, the terms "index" and "idx" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application, for example regarding block sizes. The specific values are for example purposes and the aspects described are not limited to these specific values.

Reference to "one embodiment" or "an embodiment" or "one implementation" or "an implementation", as well as other variations thereof, mean that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Further, this application or its claims may refer to "accessing" various pieces of information. Accessing the information may include one or more of, for example, receiving the information, retrieving the information (for example, from memory), storing the information, moving the information, copying the information, calculating the information, predicting the information, or estimating the information.

Additionally, this application or its claims may refer to "receiving" various pieces of information. Receiving is, as with "accessing", intended to be a broad term. Receiving the information may include one or more of, for example, accessing the information, or retrieving the information (for example, from memory or optical media storage). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The invention claimed is:

1. A video encoding method comprising:
splitting an intra coding block into a plurality of transform blocks;
obtaining a decision whether a second transform is to be applied and a selection of an index of a selected transform in a list of transforms, the second transform being a Low-Frequency-Non-Separable Transform;
when the decision is that the second transform is to be applied:
performing a first transform on all of the plurality of transform blocks, wherein the first transform is a two-dimensional (2D) discrete cosine transform (DCT) 2 transform; and
performing the second transform on all of the plurality of transform blocks of the intra coding block using the selected transform; and when the decision is that the second transform is not to be applied:
selecting a null value as the index for the second transform in the list of transforms; and
performing a first transform on all of the plurality of transform blocks, the first transform being selected in a set of transforms; and
encoding the intra coding block with signaling information representative of the index of the second transform.

2. The method of claim 1, wherein the second transform is applied when:
the size of the intra coding block is greater than a threshold in at least one of width or height;
the size of the intra coding block is smaller than a threshold in width and height;
the size of a transform block of the plurality of transform blocks is greater than a threshold in at least one of width or height; or
the size of a transform block of the plurality of transform blocks is smaller than a threshold in width and height.

3. The method of claim 1, wherein the plurality of transform blocks have different sizes, and wherein the second transform is performed based on a largest transform block of the plurality of transform blocks.

4. A video decoding method for a coding block that is split into a plurality of transform blocks, comprising:
obtaining information representative of an index of a second transform;
when the index is a null value:
performing an inverse of a first transform on all of the plurality of transform blocks of the coding block, the first transform being selected in a set of transforms; and
when the index is not a null value:
performing an inverse of the second transform on all of the plurality of transform blocks of the coding block using a second transform selected identified by the index in a list of second transforms, the second transform being a Low-Frequency-Non-Separable Transform; and
performing an inverse of a first transform on all of the plurality of transform blocks of the coding block, wherein the first transform is a two-dimensional (2D) discrete cosine transform (DCT) 2 transform; and
decoding the inversed transform blocks.

5. The method of claim 4, wherein the second transform is to be applied when:
the size of the coding block is greater than a threshold in at least one of width or height;
the size of the coding block is smaller than a threshold in width and height;
the size of a transform block of the plurality of transform blocks is greater than a threshold in at least one of width or height; or
the size of a transform block of the plurality of transform blocks is smaller than a threshold in width and height.

6. The method of claim 4, wherein the plurality of transform blocks have different sizes, and wherein the second transform is performed based on a largest transform block of the plurality of transform blocks.

7. A video encoding apparatus comprising a processor configured to:
split an intra coding block into a plurality of transform blocks;
obtain a decision whether a second transform is to be applied and a selection of an index of a selected transform in a list of transforms, the second transform being a Low-Frequency-Non-Separable Transform;
when the decision is that the second transform is to be applied:
perform a first transform on all of the plurality of transform blocks, the first transform being a two-dimensional (2D) discrete cosine transform (DCT) 2 transform; and
perform the second transform on all the transform blocks of the plurality of transform blocks of the intra coding block using the selected transform; and
when the decision is that the second transform is not to be applied:
selecting a null value as the index for the second transform in the list of transforms; and
performing a first transform on all of the plurality of transform blocks, the first transform being selected in a set of transforms; and
encode the intra coding block with signaling information representative of the index of the second transform.

8. A video decoding apparatus for a coding block that is split into a plurality of transform blocks, the apparatus comprising a processor configured to:
obtain information representative of an index of a second transform;
when the index is a null value:
perform an inverse of a first transform on all of the plurality of transform blocks of the coding block, the first transform being selected in a set of transforms; and
when the index is not a null value:
perform an inverse of the second transform on all the transform blocks of the plurality of transform blocks of the coding block using a second transform selected identified by the index in a list of second transforms, the second transform being a Low-Frequency-Non-Separable Transform; and
perform an inverse of a first transform on all of the plurality of transform blocks of the coding block, wherein the first transform is a two-dimensional (2D) discrete cosine transform (DCT) 2 transform; and
decode the inversed transform blocks.

9. A non-transitory computer-readable storage medium having stored instructions that, when executed by a processor, cause the processor to:
split an intra coding block into a plurality of transform blocks;
obtain a decision whether a second transform is to be applied and a selection of an index of a selected transform in a list of transforms, the second transform being a Low-Frequency-Non-Separable Transform;
when the decision is that the second transform is to be applied:
perform a first transform on all of the plurality of transform blocks, the first transform being a two-dimensional (2D) discrete cosine transform (DCT) 2 transform; and
perform the second transform on all the transform blocks of the plurality of transform blocks of the intra coding block using the selected transform; and
when the decision is that the second transform is not to be applied:
selecting a null value as the index for the second transform in the list of transforms; and
performing a first transform on all of the plurality of transform blocks, the first transform being selected in a set of transforms; and encode the intra coding block with signaling information representative of the index of the second transform.

10. A non-transitory computer-readable storage medium having stored instructions that, when executed by a processor on a coding block that is split into a plurality of transform blocks, cause the processor to:
obtain information representative of an index of a second transform;
when the index is a null value:
perform an inverse of a first transform on all of the plurality of transform blocks of the coding block, the first transform being selected in a set of transforms; and
when the index is not a null value:
perform an inverse of the second transform on all the transform blocks of the plurality of transform blocks of the coding block using a second transform selected identified by the index in a list of second transforms, the second transform being a Low-Frequency-Non-Separable Transform; and
perform an inverse of a first transform on all of the plurality of transform blocks of the coding block, wherein the first transform is a two-dimensional (2D) discrete cosine transform (DCT) 2 transform; and
decode the inversed transform blocks.

11. The apparatus of claim 7, wherein the second transform is applied when:
the size of the intra coding block is greater than a threshold in at least one of width or height;
the size of the intra coding block is smaller than a threshold in width and height;
the size of a transform block of the plurality of transform blocks is greater than a threshold in at least one of width or height; or
the size of a transform block of the plurality of transform blocks is smaller than a threshold in width and height.

12. The apparatus of claim 7, wherein the plurality of transform blocks have different sizes, and wherein the second transform is performed based on a largest transform block of the plurality of transform blocks.

13. The apparatus of claim 8, wherein the second transform is applied when:
the size of the intra coding block is greater than a threshold in at least one of width or height;
the size of the intra coding block is smaller than a threshold in width and height;
the size of a transform block of the plurality of transform blocks is greater than a threshold in at least one of width or height; or
the size of a transform block of the plurality of transform blocks is smaller than a threshold in width and height.

14. The apparatus of claim 8, wherein the plurality of transform blocks have different sizes, and wherein the second transform is performed based on a largest transform block of the plurality of transform blocks.

15. The non-transitory computer-readable storage medium of claim 9, wherein the second transform is applied when:
the size of the intra coding block is greater than a threshold in at least one of width or height;
the size of the intra coding block is smaller than a threshold in width and height;
the size of a transform block of the plurality of transform blocks is greater than a threshold in at least one of width or height; or
the size of a transform block of the plurality of transform blocks is smaller than a threshold in width and height.

16. The non-transitory computer-readable storage medium of claim 9, wherein the plurality of transform blocks have different sizes, and wherein the second transform is performed based on a largest transform block of the plurality of transform blocks.

17. The non-transitory computer-readable storage medium of claim 10, wherein the second transform is applied when:
the size of the intra coding block is greater than a threshold in at least one of width or height;
the size of the intra coding block is smaller than a threshold in width and height;
the size of a transform block of the plurality of transform blocks is greater than a threshold in at least one of width or height; or
the size of a transform block of the plurality of transform blocks is smaller than a threshold in width and height.

18. The non-transitory computer-readable storage medium of claim 10, wherein the plurality of transform blocks have different sizes, and wherein the second transform is performed based on a largest transform block of the plurality of transform blocks.

* * * * *